(12) United States Patent
Graves et al.

(10) Patent No.: US 6,874,897 B2
(45) Date of Patent: *Apr. 5, 2005

(54) DEFORMABLE CURVATURE MIRROR WITH UNIPOLAR-WIRING

(75) Inventors: J. Elon Graves, Kailua, HI (US); Malcolm J. Northcott, Kailua, HI (US)

(73) Assignee: AOptix Technologies, Inc., Campbell, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 10/266,981

(22) Filed: Oct. 8, 2002

(65) Prior Publication Data

US 2003/0107828 A1 Jun. 12, 2003

Related U.S. Application Data

(63) Continuation-in-part of application No. 09/769,988, filed on Jan. 25, 2001, now Pat. No. 6,464,364.
(60) Provisional application No. 60/178,416, filed on Jan. 27, 2000.

(51) Int. Cl.[7] .......................... G02B 5/08; G02B 26/00; G02B 26/06
(52) U.S. Cl. ...................... 359/846; 359/838; 359/295
(58) Field of Search ....................... 250/201.9; 359/224, 359/290, 291, 292, 295, 838, 846, 847

(56) References Cited

U.S. PATENT DOCUMENTS

| | | | |
|---|---|---|---|
| 3,904,274 A | * 9/1975 | Feinleib et al. | 359/295 |
| 4,128,309 A | 12/1978 | Lehureau et al. | |
| 4,257,686 A | 3/1981 | Albertinetti et al. | |
| 4,298,247 A | 11/1981 | Michelet et al. | |
| 4,387,973 A | * 6/1983 | Martin | 359/507 |
| 4,420,222 A | 12/1983 | Bret et al. | |
| 4,588,268 A | 5/1986 | Aldrich | |
| 5,262,696 A | 11/1993 | Culp | |
| 5,329,322 A | 7/1994 | Yancey | |
| 5,576,780 A | 11/1996 | Yancey | |
| 5,777,719 A | 7/1998 | Williams et al. | |
| 5,907,153 A | 5/1999 | Gouch | |
| 5,949,521 A | 9/1999 | Williams et al. | |
| 6,023,057 A | 2/2000 | Gaffard et al. | |
| 6,297,579 B1 | * 10/2001 | Martin et al. | 310/330 |
| 6,452,145 B1 | 9/2002 | Graves et al. | |
| 6,464,363 B1 | * 10/2002 | Nishioka et al. | 359/846 |
| 6,464,364 B2 | 10/2002 | Graves et al. | |
| 2002/0097509 A1 | 7/2002 | Graves et al. | |

FOREIGN PATENT DOCUMENTS

| | | |
|---|---|---|
| EP | 0 743 541 A1 * | 11/1996 |
| FR | 2389143 | 11/1978 |
| GB | 2247323 A | 2/1992 |
| JP | 02-094578 A * | 4/1990 |
| RU | 1 808 159 A3 * | 4/1993 |
| WO | WO 97/12267 | 4/1997 |

OTHER PUBLICATIONS

R.E. Aldrich "Deformable Mirror Wavefront Correctors", Adaptive Optics Engineering Handbook, R. K. Tyson, ed., Chapter 5. Marcel Dekker, Inc., Publ., New York, 2000.*

Ikramov, et al., "Adaptive Bimorph Mirror", PTO 04–3300, English–language translation of RU 1808159 A3, Ralph McElroy Translation Company, U.S. Patent & Trademark Office, May 2004.*

(Continued)

Primary Examiner—John Juba, Jr.
(74) Attorney, Agent, or Firm—Fenwick & West LLP (57) ABSTRACT

A deformable curvature mirror capable of controlled deformation by applying unipolar electrical voltages to electrode segments on the back of the mirror. Two plates of an electro-restrictive material, such as PZT or PMN, are jointed together. One plate has a pattern of a plurality of electrode segments on the outer surface with each electrode segment having a separate electrical terminal for applying a variable unipolar electrical voltage thereto for causing variable expansion of the plate and thereby selectively deforming that plate and, in turn, the deformable curvature mirror.

10 Claims, 5 Drawing Sheets

OTHER PUBLICATIONS

C. Schwarz, et al., "Bimorph adaptive mirrors and curvature sensing", JOSA A, vol. 11, No. 2, pp. 895–902, Feb. 1994.*

Edric Mark Ellis, "Low–cost Bimorph Mirrors in Adaptive Optics", Doctoral Dissertation, Applied Optics, Department of Physics, Imperial College of Science, Technology, and Medicine, University of London, Chapters 3 & 5 with bibliography, Apr. 1999.*

Chellabi, A. et al., "A New Control Algorithm for Bimorph Mirrors," *Systems, Man and Cybernetics*, 1995, vol. 1, IEEE Conf. on Intelligent Systems for the $21^{st}$ Century, pp. 569–573.

Dreher, Andreas W. et al., "Active optical depth resolution improvement of the laser tomographic scanner," *Applied Optics*, vol. 28, No. 4, Feb. 15, 1989, pp. 804–808.

Graves, J. Elon et al., "First Light for Hokupa'a: 36 Element Curvature AO System at UH," Proceedings of SPIE vol. 3353, Mar. 1998, pp. 34–43.

Graves, J.E. et al., "Latest Results from the University of Hawaii Prototype Adaptive Optics System," Univ. Hawaii Laser Guide Star Adaptive Optics Workshop: Proceedings—vol. 1, Mar. 10–12, 1992, pp. 511–521.

Ribak, Erez N., "Deformable Mirrors," *Adaptive Optics for Astronomy*, D.M. Alloin and J.M. Mariotti (eds.), Kluwer Academic Publishers, Netherlands (1964), pp. 149–161.

Roddier, C. et al., "New optical testing methods developed at the University of Hawaii; results of ground–based telescopes and hubble space telescope," SPIE, vol. 1531, *Advanced Optical Manufacturing and Testing II* (1991), pp. 37–43.

Roddier, Francois et al., "A Simple Low–Order Adaptive Optics System for Near–Infrared Applications," Publications of the Astronomical Society of the Pacific, vol. 103, No. 659, Jan. 1991, pp. 131–149.

Roddier, Francois, "Curvature sensing and compensation: a new concept in adaptive optics," *Applied Optics*, vol. 27, No. 7, Apr. 1, 1998, pp. 1223–1225.

Roddier, Francois, "Wavefront sensing and the irradiance transport equation," *Applied Optics*, vol. 29, No. 10, Apr. 1, 1990, pp. 1402–1403.

Safronnov, Andrey G., "Bimorph Piezoelectric Structures in Laser and Astronomic Adaptive Optics," Conference on Lasers and Electro–optics, Europe 1996, Tuesday/1991, CTuK4, 1 page.

Zhao, Hua Wei et al., "Prototype Bimorph Mirror for the ATT Adaptive Optics System," SPIE vol. 3126, *Adaptive Optics and Applications* (1997), pp. 384–390.

* cited by examiner

DEFORMABLE CURVATURE MIRROR WITH UNIPOLAR-WIRING

CROSS-REFERENCE TO RELATED APPLICATIONS

This application is a continuation-in-part of U.S. patent application Ser. No. 09/769,988, filed on Jan. 25, 2001, now issued as U.S. Pat. No. 6,464,364, which claimed priority from U.S. Provisional Application Ser. No. 60/178,416, filed Jan. 27, 2000.

BACKGROUND

1. Field of the Invention

The present invention relates to a deformable curvature mirror that is capable of controlled deformation by the application of electrical voltages to the mirror and, in particular, is directed to such a mirror that is for use in an adaptive optics system having a wavefront sensor for controlling the deformation of the curvature mirror.

2. Background of the Invention

There are various adaptive optics methods and devices which include a wavefront sensor for sensing the aberrations in the wavefront of light waves and then correcting or compensating for those aberrations, such as the atmospheric aberrations that effect the viewing of stars and planets through a telescope. The existing methods and devices for sensing and measuring the wavefront include several interferometric techniques, the Shack-Hartmann wavefront sensing techniques and various other systems involving the projection of patterns of light through an optical system.

Such prior techniques and systems are typically complex and expensive, as well as having various inherent deficiencies. In addition to the deficiencies of the prior art wavefront sensors, the deformable mirrors that are controlled by those wavefront sensors for adaptive optics also include numerous deficiencies. For example, a stack actuator mirror is comprised of a multiplicity of push rods engaging the back of a flexible mirror and the extension-retraction of each push rod is usually controlled by a Shack-Hartmann wavefront sensor. The Shack-Hartman wavefront sensor measures local slopes of the wavefront and these slopes are fitted with a wavefront reconstructor which in turn generates a continuous surface, matching all the slopes. This type fitting is blind to hysterisis effects in the actuators thereby causing a waffle pattern to appear on the mirror surface. The push rods tend to produce a deformation which is nearly a straight line on the mirror surface between each pair of adjacent push rods that results in large fitting errors When a small number of actuators are used. Moreover, the number of push rods and, therefore, the closeness of the push rods is physically limited, as well as the length of their travel, whereby the accuracy and degree of optical correction that can be applied by the stack actuator type mirror is limited. Since all actuators have the same travel and are attached to a rigid reference surface, the mirror has the same stroke for all modes, i.e. low order focus has the same stroke as the highest mode produced by every other actuator being turned on and off. For correcting the aberrations originating in the atmosphere, this range of stroke at the highest modes is not necessary, whereby the corrections may not be accurate for small errors.

One deformable mirror that overcomes many of these problems uses electro-restrictive material to controllably deform the mirror. Voltages are selectively applied to electrodes to deform the mirror. However, voltage sources that are capable of providing bipolar voltages (both positive and negative) are expensive. In addition, the electro-restrictive materials have a polarity, meaning that they respond better to voltage of one polarity. When the voltage of the reverse polarity is applied, the electro-restrictive material performs more poorly and may even be damaged so as to lose its electro-restrictive properties. Therefore, it is desirable to provide a deformable mirror that uses unipolar voltage sources (either positive or negative) to control the deformation of the mirror.

SUMMARY OF THE INVENTION

The present invention provides a deformable curvature mirror that is controlled by the application of unipolar voltage sources. The mirror includes a pattern of electrode segments on the backside of the mirror that are of a size, shape and arrangement for producing the mirror deformation necessary for the particular application of the mirror by selectively applying variable unipolar voltages to the individual electrode segments.

In one embodiment, the deformable curvature mirror that includes two plates of electro-restrictive or magneto-restrictive material adhered together. These plates, which are of similar PZT type in one embodiment, are glued together with an adhesive, then a mirror surface is placed on one side, and a pattern of electrode segments is placed either between or on the back side, whereby the application of a variable unipolar voltage to the individual electrodes causes a charge to accumulate on the conductive layer thereby producing an electric field for causing a controlled expansion or contraction of the electro-restrictive plates in the individual areas defined by the electrode segments.

In another embodiment, a gold layer is between the two plates. A variable unipolar voltage is selectively applied to this layer in addition to the electrodes. This allows more control over the deformation of the mirror.

DETAILED DESCRIPTION OF THE PREFERRED EMBODIMENTS

Figure 1:
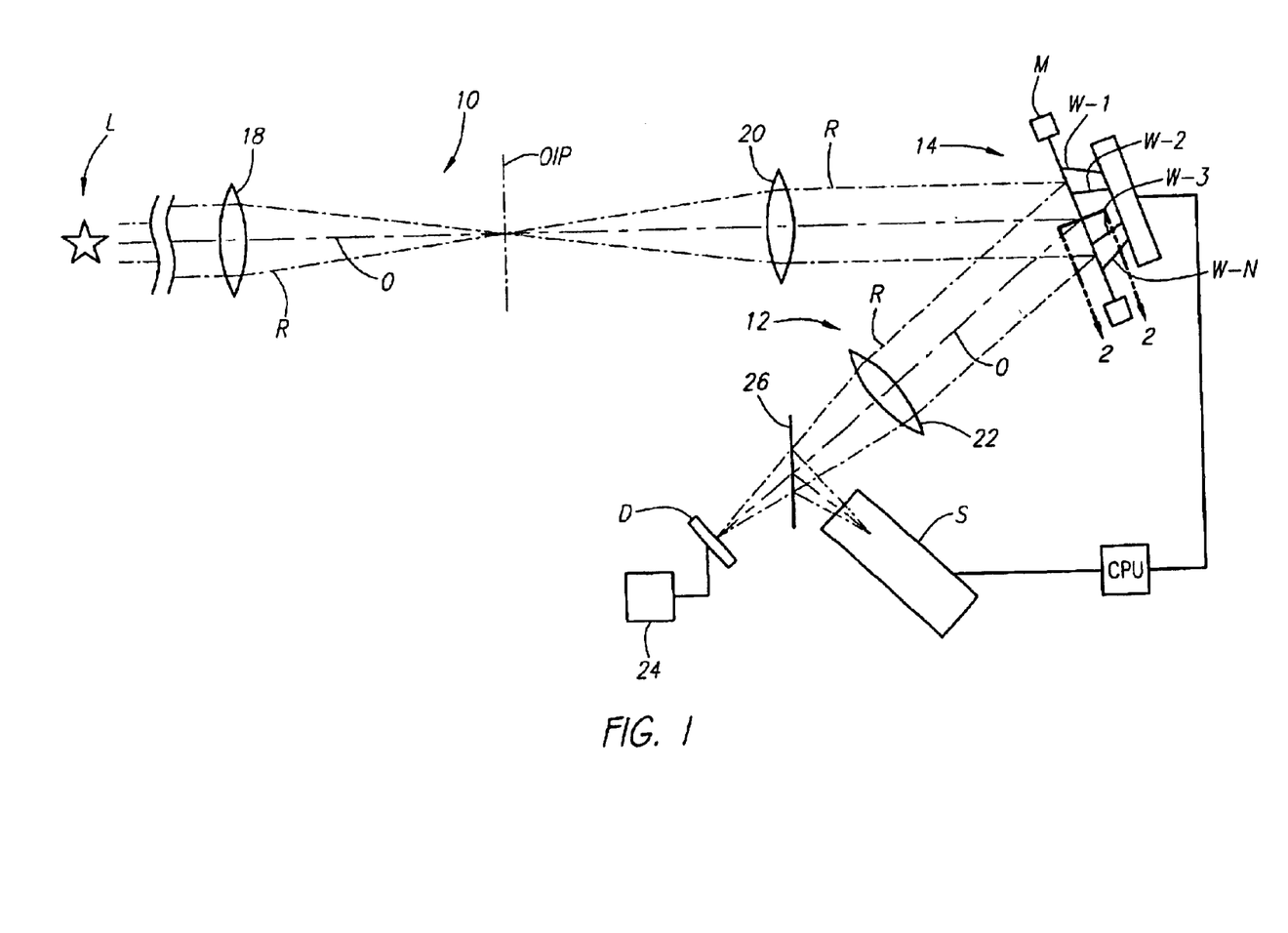
FIG. 1 is a diagrammatic illustration of a typical optical system, namely, a telescope, provided with an adaptive optics system that includes the deformable curvature mirror of the present invention.

Referring now to FIG. 1, a simplified form of an optical system, such as a telescope 10, is illustrated with an adaptive optics system, generally designated 12, that includes the deformable curvature mirror 14 of the present invention. Light rays R from any light source L, such as the illustrated star when the telescope 10 is used for observing stars and planets, enter the telescope 10 through a lens 18 that focuses the light rays on an object image plane OIP where the image of the light source L (here a star, for example) exists in focus but is uncorrected. The telescope 10 also may be of a type and construction for receiving light waves from an earthbound data transmission station L, such as in a system for transmitting data from building-to-building, tower-to-tower, mountain-to-mountain or from ground to space.

The light rays R then pass through a collimating lens 20 to the deformable mirror 14 of this invention. Thus, in FIG. 1, the light rays R reaching the telescope 10 from a distant star or other distant light source L would be undistorted and theoretically could produce a diffraction limited image of the source. However, as is well known to astronomers, the earth's atmosphere creates aberrations in the light rays R before reaching the telescope 10, which aberrations vary with the atmospheric conditions and rapidly over any period of time, even when the telescope is located at high elevations. Similarly, if the telescope 10 is used for viewing something on earth at a distance or for receiving light waves for data transmission from a station at a distance on earth, the earth's atmosphere will create aberrations in the light rays R and, therefore, produce a wavefront that can not produce a diffraction limited image and is constantly changing when it reaches the telescope 10. Various wavefront sensors have been used to detect the variations in the wavefront caused by the atmospheric aberrations and then to compensate or correct for those aberrations by adaptive optics, such as by using a deformable mirror controlled by a wavefront sensor. One type of wavefront sensor that is particularly suited for use with the deformable curvature mirror 14 of the present invention is a wavefront curvature sensor that uses a pair of defocused pupil images as described and shown in the copending U.S. patent application Ser. No. 09/579,786, filed May 26, 2000 by the inventors hereof, which is incorporated herein by this reference.

The light rays R reflect from the surface of the deformable mirror 14 to a lens 22 that refocuses the image on the plane of an image detector D. The lens 18, collimating lens 20, deformable mirror 14, lens 22 and image detector D are all located and centered on the optical axis O of the system. The image detector D may be of any convenient type that is suitable for the particular application of the system, such as a conventional detector in a video camera, a custom format of charge couple device (CCD), an array of PIN diodes, an array of optical fibers, photon counting detectors, or the like. The detector D provides images and/or data relative to the light intensity throughout the image focused on detector D and these images and/or data are displayed and/or recorded on an appropriate device 24 suitable for this application of the system. When the deformable mirror 14 is not activated and working in closeloop with the wavefront sensor, the image appearing at the image detector D will be the uncorrected image received by telescope 10. When the deformable mirror 14 is appropriately deformed in the manner described below to compensate for the aberrations, the image at detector D will be diffraction limited, i.e. a corrected image. Similarly, if the system is used for data transmission by light waves, the detector D will receive and detect corrected light rays when the deformable mirror 14 is properly deformed to correct for aberrations in the light rays R transmitted to the system illustrated in FIG. 1. Still further, when such a system is used for transmitting data by light rays, the wavefront can be sensed and corrected by the deformable mirror 14 and the same mirror shape can be used to pre-correct a data light emitter positioned at the same location as image detector D.

A partial mirror or beamsplitter 26 is positioned on the optical axis 0 between lens 22 and detector D for reflecting a portion of the light rays R to a wavefront sensor S, such as one of the wavefront sensors disclosed in the inventors' copending patent application identified above. In the preferred embodiment of the system employing the deformable mirror 14 of the present invention, the wavefront sensor S senses two defocused pupil images (or the shapes and light intensities for some detectors used in a wavefront sensor S) which are communicated to the central processing unit CPU for processing by data reduction software to derive the wavefront curvature and provide data appropriate for the operation of the deformable mirror 14. Specifically, as is well known in the art, the wavefront is derived or recovered by solving the Poisson equation with respect to intensities with the Dirichlet's boundary conditions relative to the shape of the extrafocal images. An iterative data reduction algorithm or other non-linear fitting technique may be employed to compensate for non-linearity in measurements in an open loop system. The CPU then provides a plurality of separate and controlled high voltage electrical potentials to a plurality of conductive electrode segments (described below) on the back of deformable mirror 14 through a like plurality of separate wires W-1, W-2, W-3 through W-N. The deformable mirror 14 is fixedly mounted in a mount M that is appropriately positioned to reflect the optical axis O and light rays R from the collimating lens 20 to the detector D. As will appear more fully from the description below of the details of a preferred embodiment of the deformable mirror 14, the overall slope of the mirror, i.e. the angle of reflection of the optical axis O, can be modified by the application of high voltages applied to selected electrode segments of the deformable mirror 14 through one or more of the wires W-1 through W-N and the curvature of the surface of the deformable mirror 14 may be modified for correcting aberrations by the application of controlled high voltages also through wires W-1 through W-N.

Figure 2:
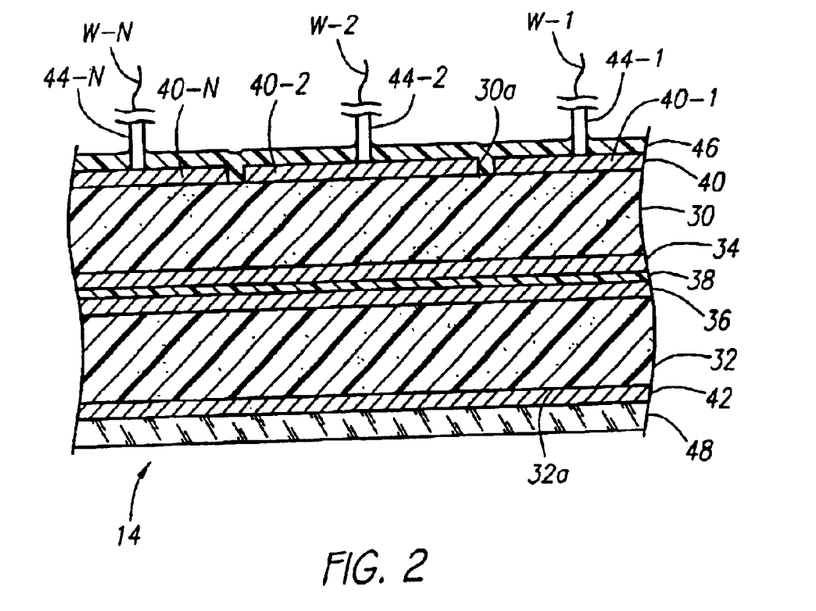
FIG. 2 is an enlarged, fragmentary sectional view through a portion of the deformable curvature mirror taken substantially on the line 2—2 in FIG. 1.

Referring now to FIG. 2, a fragmentary and enlarged cross-section of a portion of the deformable curvature mirror 14, taken on the line 2—2 in FIG. 1, is shown with the thicknesses of some of the layers of the laminated construction exaggerated for ease of illustration. The basic, physical structure of the deformable mirror 14 is comprised of two discs or plates 30 and 32 of any electro-restrictive material that exhibits controlled expansion and contraction in response to the application of an electrical potential across the material and yet the material has an adequate structural strength and rigidity to maintain a given shape, as distinguished from being flexible. A preferred material is ceramic PZT, which is a piezoelectric material comprised of Pb, Zu, Ti and O though a possible alternative is a magnetorestrictive material known as PMN comprised of Pb, Mg, Nb and O.

The plates 30 and 32 of the electro-restrictive material are separately ground to produce optically flat surfaces and a uniform thickness that depends on the size of the deformable mirror 14 but, in general, sufficiently thin to accommodate the flexures caused by the expansion and contraction induced by the electrical voltages. For example, in a deformable mirror 14 of about 50 mm in diameter, each of the PZT plates 30 and 32 preferably would be less than two millimeters and more than 0.1 mm in thickness. Similarly, for a larger mirror 14 of about 150 mm in diameter, each plate 30 and 32 preferably would of a thickness between about 2.0 mm and 8.0 mm.

A layer 34 of gold or other highly conductive material (hereinafter referred to as a gold layer for convenience) is applied to the lower surface of plate 30 and a gold layer 36 is applied to the upper surface of plate 32 and then the two plates 30 and 32 are laminated together and joined by a conductive adhesive 38.

The PZT plates have a polarity in a direction perpendicular to the deformable mirror 14, which causes the PZT to expand along the axis of polarity when an electrical voltage is applied in the direction of polarity across the plate and to contract along the axis of polarity when the electrical voltage is applied in the direction opposite to polarity across the plate. As the PZT expands along the axis of polarity, it contracts in the perpendicular direction, so that the volume remains substantially constant. Similarly, as the PZT contracts along the axis of polarity, it expands in the perpendicular direction, again retaining substantially the same volume. An approximately two to five times greater field strength may be applied in the direction of polarity as in the direction opposite to polarity without impairing or destroying the electro-restrictive properties of the PZT. This means that approximately two to five times the expansion can be achieved when applying a field in the direction of polarity than when applying a field in the direction opposite to polarity without damaging the PZT. Further, when the voltage is applied in the direction of polarity the hysterisis is less than when the voltage is applied in the direction opposite to polarity.

Before the two plates 30 and 32 are joined by the conductive adhesive 38, the respective polarities of those two plates are aligned, that is, each plate 30 and 32 will exhibit a physical contraction in the direction perpendicular to the mirror 14 when an electric field created by the applied voltage with the positive potential on top and the negative potential on the bottom, as shown in FIG. 2. Thus, as will appear more clearly below, to the extent that any electric field traverses the lower PZT plate 32, which is primarily inactive, the directions of expansion and contraction of the two plates 30 and 32 will be the same rather than tending to oppose each other.

After the two plates 30 and 32 are bonded together by the adhesive layer 38, a plating mask (not shown) is applied to the outer surface 30a to create a predetermined pattern, as described below, and then gold layers 40 and 42 are applied to the outer surfaces 30a and 32a, respectively, of the plates 30 and 32. The mask and gold covering the mask on surface 30a are removed to leave a pattern of gold electrodes 40-1, 40-2 through 40-N, only three of which are shown in the enlarged, fragmentary view of FIG. 2.

A mirror layer 48 is applied to the outer surface 32a of plate 32 by any convenient means such as epoxy replication wherein the mirror layer 48 is first formed separately and then adhered to the surface 32a. Forming the mirror layer 42 by the epoxy replication method includes the steps of applying a mold separation material on a flat surface, applying a layer of reflective material, such as silver or gold, and then a layer of epoxy before adhering the mirror layer 48 to the gold layer 42 on the outer surface 32a of plate 32 by an appropriate adhesive, such as epoxy, and curing the assembly at an elevated temperature. As an alternative to a separate mirror layer 48, the outer surface of gold (or other metal) layer 42 may be polished to a mirror-like condition, which may be adequate for some applications of the deformable mirror 14.

Electric terminals 44-1, 44-2 through 44-N are attached to the electrode segments 40-1 through 40-N by any convenient means, such as soldering. An insulating layer 46 is then applied over the gold layer 40 (comprised of electrode segments 40-1 through 40-N) and fills to gaps between the electrode segments formed by the mask material.

When the deformable mirror 14 is installed in an adaptive optics system, such as the system shown in FIG. 1, the wires W-1 through W-N are attached to the terminals 44-1 through 44-N, respectively. Electrical terminals and wires are also attached to the intermediate gold layers 34, 36 and the outer gold layer 42 by any convenient means, such as at the edge of the deformable mirror 14 or by drilling through the deformable mirror 14 near the periphery and installing one or more terminals and wires. As thus far described, it may be seen that in one preferred embodiment where the gold layers 34, 36, 42 are all connected to ground and a positive voltage is applied to one or more of the wires W-1 through W-N that an electric field will appear across electro-restrictive plate 30 to gold layer 34 from each electrode segment 40-1 through 40-N to which the electrical potential has been applied. Since gold layers 34, 36, and 42 are all connected to ground, there is no electric field across plate 32 to grounded gold layer 42. Thus, while the electric field will cause lateral expansion of the plate 30, the plate 32 will not be affected. The magnitude of the expansion below each electrode segment 40-1 through 40-N will depend on the magnitude of the voltage applied to that electrode segment which expansion in turn causes the mirror 14 to deform in a controlled manner as a result of the electro-restrictive properties of the materials of the plates 30 and 32.

By way of further explanation of the basic principle of operation of mirror 14, as the rear plate 30 expands and contracts in the areas to which the electrode segments 40-1 through 40-N are affixed, as the electric fields are generated by the voltages applied to those electrode segments, the front (mirrored) plate 32 does not correspondingly expand and contract, and therefore a bending moment is introduced into the mirror 14. In this basic embodiment of mirror 14, both sides of front plate 32 have a gold layer which are electrically connected so that the front plate 32 and rear plate 30 mechanically behave in the same manner, such as with respect to thermal expansion and contraction, because the thermal expansion coefficient is controlled by grounding. The build-up of an electrical charge in PZT by temperature changes causing expansion and contraction would store energy in the PZT and adversely effect the control of the curvature of the mirror surface 48. By connecting the front and rear sides of each plate 30 and 32 such that charge can flow between the front side and the rear side of the front plate 32 and between the front side and the rear side of rear plate 30, the adverse expansion and contraction affects of temperature changes are avoided. Methods for such connections include connecting the front and rear sides of a plate through an amplifier and simply electrically connecting the front and rear sides of a plate ("shorting" the electro-restrictive material).

Figure 3:
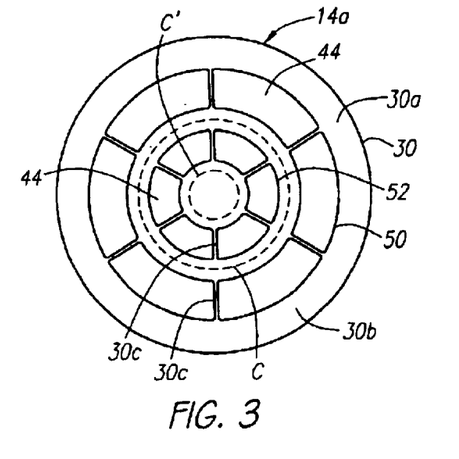
FIGS. 3–6 are elevation views of the rear side of the deformable curvature mirror of the present invention illustrating four different patterns of electrode segments.
Figure 4:
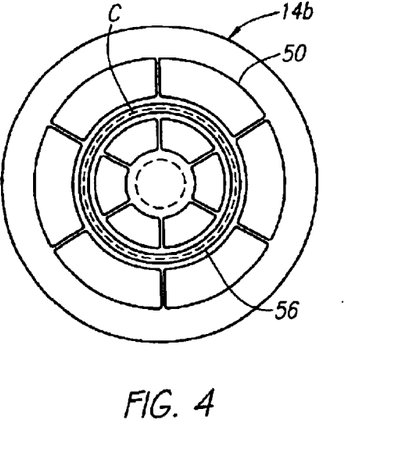
Figure 5:
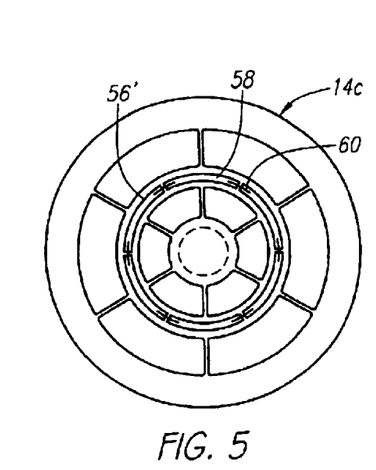

Referring now to FIGS. 3–6, which are plan views from the back, four typical patterns for the electrodes 40 on the deformable mirror 14 are shown with the terminals 44-1, 44-N omitted for clarity. Also, for convenience of illustration and comparison of electrode patterns, each of the deformable mirrors 14a, 14b, 14c and 14d of FIGS. 3, 4, 5 and 6, respectively, is shown as being round and of the same size but it will readily appear to those skilled in the art that the deformable mirror 14 may be of a non-round shape for non-round adaptive optic systems, such as for lasers, and may be of different sizes, such as four different sizes of telescopes. The pattern of electrode segments 40-1, 40-N on the outer surface 30a of plate 30 is formed by the mask that is applied to the outer surface 30a prior to applying the gold layer 40, as described above. The mask for each of the deformable mirrors 14a–14d includes a perimeter portion to create a perimeter ring 30b of exposed surface of the plate 30, as well as the outer surface 32a of plate 32, for mounting the deformable mirror 14 in a supporting mount M (see FIG. 1). Thin strips of the masking material extend radially like spokes on the surface 30a to form gaps 30c between adjacent electrode segments 40-1, 40-N formed in circular rings, such as the outer rings 50 and inner rings 52 shown in FIGS. 3–6 and the central ring 54 shown in FIG. 6. In the embodiments of FIGS. 3, 4 and 5, there are six electrode segments in the outer ring 50 and six electrode segments forming the inner ring 52, whereas in the electrode pattern of FIG. 6, there are eighteen electrode segments 44 in the outer ring 50, twelve electrode segments in the inner ring 52 and six electrode segments 44 in the central ring 54, but any number of electrode segments and separate rings may be used for a particular application., In each of the electrode patterns illustrated in FIGS. 3–6, an annular space is provided between the outer ring 50 and inner ring 52 of electrode segments, and the circular dashed line C in that annular space represents the outer diameter of the image received by the optical system, such as the outer diameter of the pupil of the imaging system. Similarly, a dashed line C' at the center of each mirror 14 in FIGS. 3–6 represents an inner diameter of the pupil of the imaging system, so that no image appears inside of circle C'. One example of an imaging system that has such an inner diameter is a reflective celestial telescope. In other words, although the mirror layer 48 may cover the entire portion of the surface of the deformable mirror 14 opposite the surface portion having the electrode patterns shown in FIGS. 3–6, the image from the imaging system with both outer and inner pupil diameters, such as a reflective celestial telescope, is only reflected from the portions of the mirror between the outer diameter C and inner diameter C'. In a imaging systems with only an outer pupil diameter, such as most nonreflective type telescopes, the image would cover the entire area within outer circle C with no inner blank space within the circle C'.

Figure 6:
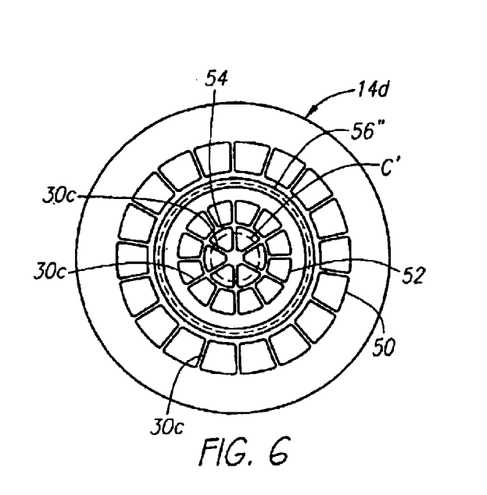

In the typical embodiments of the electrode patterns of the present invention illustrated in FIGS. 3–6, the outer ring 56 of electrodes controls the slope of the mirror by selectively applying voltages to each of the electrode segments 40-1, 40-N in the outer ring 50 to thereby tilt or change the slope of the whole mirror in any desired direction or amount, within the structural limits, for any desired purpose in connection with the adaptive optics system. The inner ring 52 of electrode segments, as well as the central ring 54 of electrode segments in FIG. 6, control the curvature of the mirror surface by applying appropriate voltages to each of the electrode segments. The gaps 30c between electrode segments are large enough to insulate adjacent segments from each other but sufficiently small that the electric field passing through the plates 30 to the grounded layers 34, 36 and 42 migrates and overlaps the segments to provide a smooth transition on the surface of the mirror layer 48 when different voltages are applied to adjacent electrode segments 40-1, 40-N. With this arrangement, a total of approximately one hundred microns (0.1 mm) of deflection of the center of the deformable mirror 14 may be accomplished because, in part, the outer ring 50 can cause a portion of the deflection and the inner ring 52 and central ring 54 can accomplish additional deflection therebeyond, as distinguished from the Shack-Hartmann system using push rods that have a limited displacement of typically eight microns (0.008 mm) from a reference base plate, even at the center of the mirror. FIG. 3 illustrates a basic electrode segment pattern with the functions and advantages thus far described and FIGS. 4–6 illustrate some modifications.

Referring more specifically to FIG. 4, an intermediate ring 56 of a layer of gold is formed in the annular space between the outer ring 50 and inner ring 52 of electrode segments as a modification to the embodiment illustrated in FIG. 3. The intermediate ring 56 is electrically grounded for preventing the build-up of an electrostatic charge on that portion of the surface 30a of plate 30 that may be caused by expansion/contraction and movement of the plate 30 or, conversely, that may cause undesired expansion/contraction and movement of the plate 30. The intermediate ring 56 may be applied at the same time as the gold layer 40 by an appropriate shape of the same mask or may be applied in a subsequent plating step.

Referring more specifically to FIG. 5, an intermediate ring 56' is formed on the surface 30a of plate 30 in the annular space between the outer ring 50 and inner ring 52 of electrode segments for the same purposes as intermediate ring 56 illustrated in FIG. 4. Ring 56' is formed by separate circumferentially extending segments 58, six being shown, with gaps formed between the segments 58 by the same mask during application of the gold layer 40, which simplifies the construction of the mask by having connecting portions for the mask. After the plating step and removal of the mask to form the segments 58, connectors 60 of a conductive material are applied between the segments 58 to connect them into a conductive ring 56' which is grounded. An intermediate ring 56" is also shown in FIG. 6 which may be of the type shown in FIG. 4 or FIG. 5 for the same purposes.

Referring more specifically to FIG. 6, the central ring 54 of electrode segments provides additional control of the curvature of the mirror layer 48 even though a portion of those electrode segments are radially inward from the dashed-circle C' representing the inner extremity of the image. Of course, in a non-reflective type telescope or other system using adaptive optics, these segments of the central ring 54 would be important to controlling the curvature of that portion of the mirror layer 48 since an image would be reflected from that portion.

Referring now to FIGS. 7A–7F, various embodiments of the different layers and different electrode patterns, as well as the electrical connections thereto, of the deformable curvature mirror 14 are diagrammatically illustrated. Specifically, the electrode pattern layer 40 is shown at the top of each of FIGS. 7A–7F as one outer side of the deformable mirror 14 (omitting the terminals 44-1, 44-N and the insulation layer 46 that is coated on electrode layer 40) and the mirror surface layer 48 is shown at the bottom of each of FIGS. 7A–7F as the other side of the deformable mirror 14, with the layers therebetween illustrated in the order from top to bottom that is shown in FIG. 2. In other words, immediately below the electrode layer 40 is the electro-restrictive plate 30, then the gold layer 34, then the adhesive layer 38, then the gold layer 36, then the electro-restrictive plate 32, then the gold layer 42 and finally the mirror layer 48. Some of the layers are illustrated with cross-hatching on their surfaces for distinguishing them with other layers but the cross-hatching is not intended to illustrate a sectional view through such layers. Also, the electrode pattern layers 40 in FIGS. 7A–7D and 7F are merely diagrammatic illustrations for showing the differences in the embodiments without necessarily illustrating electrode patterns that would be used commercially. Further, the mounting perimeter portions 30b are omitted for simplicity and clarity. FIGS. 7A–7F also illustrate the electrical connections to the various conductive layers, namely, electrode segment layer 40 and gold layers 34, 36 and 42 of the deformable mirror 14 with the letters "HV" indicating a variable high voltage to the entire layer or each of the individual electrode segments, although for simplicity of illustration only a single line to all of those segments is shown, such as electrode segment layer 40 in FIG. 7A. Further, the ground side of the electrical system is indicated by either the electrical ground symbol, such as shown at the bottom left side of FIG. 7A or the letters "GND".

Figure 7A:
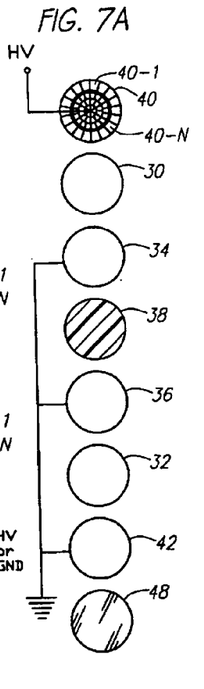
FIGS. 7A–7F are diagrammatic views illustrating the layers of different materials that comprise various embodiments of the deformable curvature mirror of the present invention.

Referring more specifically to the embodiment of FIG. 7A, which is also typical of the embodiment shown and described with respect to FIG. 2, the gold layers 34, 36 and 42 are all connected to electrical ground as shown on the left side of FIG. 7A. The plurality of electrode segments 40-1 through 40-N of the electrode layer 40 are individually connected to the controllable source of high voltage HV for selectively applying the desired voltage to each segment 40-1, 40-N for deforming the mirror. The electric field is applied across the electro-restrictive plate 30 to the grounded gold layer 34. While the single gold layer 34 may be adequate to ground and conduct all of the electricity supplied from the electrode layer 40, it is preferred that the additional electrical ground of gold layers 36 and 42 be provided to eliminate any possibility of any stray electricity or electrostatic charge affecting the second plate 32 in an uncontrolled manner in this embodiment.

In one embodiment of FIG. 7A, the high voltage source HV applied to the plurality of electrode segments 40-1 through 40-N is unipolar. That is, the voltage source can supply positive voltage(s) or negative voltage(s), but not both. Since such unipolar voltage sources are less expensive than bipolar voltage sources, this results in a less expensive deformable mirror. Preferably, the polarity of the unipolar voltage source is chosen such that the voltage across the electro-restrictive plate 30 to the grounded gold layer 34 is in the same direction of the polarity of the electro-restrictive plate 30. An approximately two to five times greater field strength may be applied in the direction of polarity as in the direction opposite to polarity without impairing or destroying the electro-restrictive properties of the PZT. This allows greater deformations than if the voltage across the electro-restrictive plate 30 to the grounded gold layer 34 were in the opposite direction of the polarity of the electro-restrictive plate 30 without impairing or destroying the electro-restrictive properties of the PZT.

Figures 7B, 7C:
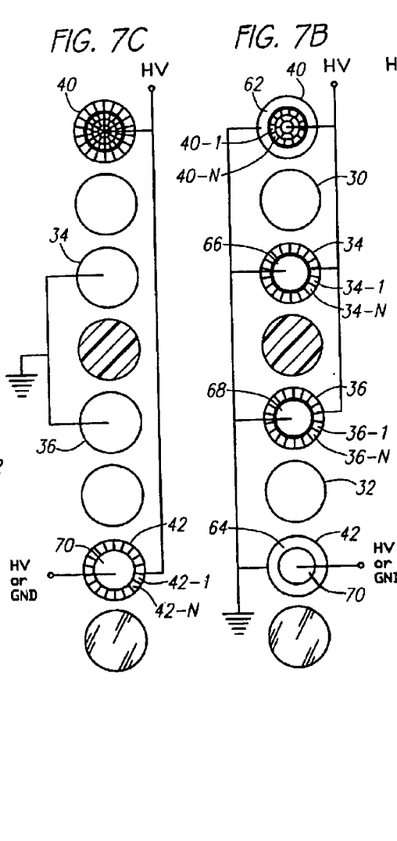

Referring now to FIG. 7B, a different arrangement of the electrode segments for causing controlled deformation of the mirror 14 is shown wherein an outer ring of electrode segments 34-1 through 34-N are provided in the gold layer 34 (rather than in gold layer 40), similar to the outer ring 50 of electrode segments described with respect to FIGS. 3–6 and an annular ring 62 of gold in layer 40 is grounded on the opposite side of plate 30, whereby the slope of the mirror 14 may be controlled, at least in part, by applying the variable high voltages to the segments 34-1 through 34-N so that the electric field is imposed across the electro-restrictive plate 30 to the ground ring 62. Similarly, the second intermediate gold layer 36 is provided with an outer ring of electrode segments 36-1 through 36-N that match and are superimposed on the electrode segments 34-1 through 34-N, respectively, with the conductive adhesive layer therebetween, and an outer gold ring 64 is provided on the bottom of the other electro-restrictive plate 32 as a portion of gold layer 42, which ring 64 is grounded whereby the electric field is imposed between electrode segments 36-1, 36-N of layer 36 through the plate 32 to the ground ring 64. The layer 40 is provided with electrode segments in the central portion comprised of, for example, an inner ring 52, as shown in FIGS. 3–5, or both an inner ring 52 and a central ring 54 as shown in FIG. 6 of electrode segments that are supplied with the variable high voltages for controlling the curvature of the central portion of the deformable mirror 14 from which the image is reflected. The gold layers 34 and 36 are provided with central circles or discs 66 and 68 that are positioned opposite the inner ring and central ring of electrode segments of layer 40 to allow imposition of an electric field from those segments through the electro-restrictive first plate 30 for controlling the curvature of the mirror. The bottom gold layer 42 is also provided with a central disc 70 opposite discs 66 and 68 which may be grounded for the same purposes described with respect to layer 42 in the embodiment of FIG. 7A. In the alternative, disc 70 may be connected to a high voltage source for applying a voltage across the electro-restrictive second plate 32 to the grounded discs 66, 68 for causing a large and uniform deflection of the deformable mirror as an extra focus stroke in addition to the individual curvature deformations caused by the central electrode segments 40-1 through 40-N. The mirror layer 48 may be confined to a central portion approximating or smaller than the size of disc 70 to minimize the possibility of electrical arcing therethrough between ring 64 and disc 70. This arrangement of FIG. 7B allows for twice the stroke in the edge actuators compared to the arrangement of FIG. 7A. When a voltage is applied to one or more of the edge actuator segments 34-1 through 34-N and 36-1 through 36-N, both plates 30 and 32 will respond with an area of one expanding and a corresponding superimposed area of the other contracting to essentially double the bending movement. The individual electrode segments 34-1 through 34-N may be electrically connected to the corresponding segments 36-1 through 36-N by holes filled with conductive epoxy.

Referring now to the embodiment of FIG. 7C, again the gold layer 40 is provided with electrode segments 40-1 through 40-N in the inner ring and/or central ring portions that are connected to the variable high voltage source for causing curvature changes in the deformable mirror 14 as in the embodiment of FIG. 7B. The intermediate or center gold layers 34 and 36 are grounded, as in the embodiment of FIG. 7A. The bottom gold layer 42 is provided with an outer ring of segments 42-1 through 42-N, similar to the outer ring 50 of the embodiments shown in FIGS. 3–6, to which variable high voltages are applied for controlling the slope of the deformable mirror 14. The upper gold layer 40 is also provided with an outer ring of segments 40-1 through 40-N that are positioned opposite the segments 42-1 through 42-N, respectively. In addition, bottom gold layer 42 is provided with a central disc 70 that may be grounded or connected to a second high voltage source for providing the large and uniform deflection of the deformable mirror 14 for extra focus stroke, similar to the disc 70 of the embodiment of FIG. 7B. Similarly, the mirror layer 48 may be limited to the central area of disk 70 to avoid arcing, as described above. This arrangement of FIG. 7C accomplishes the same doubling of the stroke of edge actuators as the arrangement of FIG. 7B but the electrical connections to the edge electrode segments is easier.

Figure 7D:
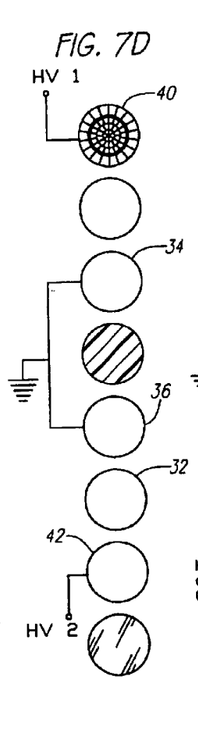

Referring now to FIG. 7D, another embodiment of the arrangement of the electrode segments and ground layers is illustrated wherein the upper gold layer 40 and central gold layers 34 and 36 may be substantially the same as the embodiment of FIG. 7A wherein both the slope and the curvature of the mirror 14 are controlled by voltages applied by a first high voltage source HV 1 to electrode segments provided in outer, inner and central rings of electrode segments 40-1 through 40-N of the gold layer 40 and layers 34 and 36 are grounded. In addition, the bottom gold layer 42 may be connected to a second high voltage source HV 2 (rather than ground, as in FIG. 7A) for providing an electric field across the second electro-restrictive plate 32 to ground layers 34 and 36 to cause a large and uniform deflection of the deformable mirror 14 for an extra focus stroke, similar to the function of the central disc 70 in the embodiments of FIGS. 7B and 7C when a second high voltage is applied to discs 70.

In one embodiment of FIG. 7D, each of the two high voltage sources HV1 and HV2 applied to the plurality of electrode segments 40-1 through 40-N, and bottom gold layer 42 are unipolar. That is, the voltage sources can supply positive voltage(s) or negative voltage(s), but not both. Since such unipolar voltage sources are less expensive than bipolar voltage sources, this results in a less expensive deformable mirror. Preferably, the polarity of the unipolar voltage source is chosen such that the voltages across the electro-restrictive plate 30 to the grounded gold layer 34 is in the same direction of the polarity of the electro-restrictive plate 30, and the voltage across the electro-restrictive plate 32 to the grounded gold layer 36 is in the same direction of the polarity of the electro-restrictive plate 32. This provides greater deformations than if the voltages were in the opposite direction of the polarity of the electro-restrictive plates 30 or 32, and reduces the chances of damaging the electro-restrictive properties of the electro-restrictive plates 30 or 32.

Figure 7E:
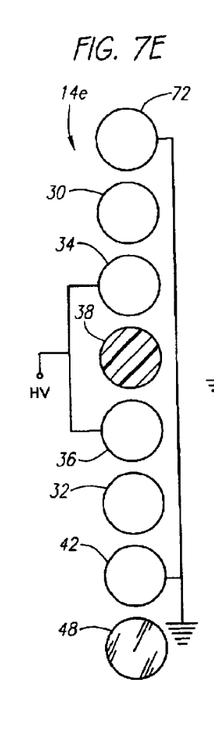

Referring now to FIG. 7E, another embodiment of the deformable mirror 14 having different uses than the previously described deformable mirrors of this invention is diagrammatically illustrated. An upper gold layer 72 is a single circle or disc rather than having a plurality of electrode segments 40-1 through 40-N, as in the upper gold layer 40 of the previously described embodiments. This embodiment of FIG. 7E includes, in order from the upper layer 72 downward, the electro-restrictive plate 30, the gold layer 34, the conductive adhesive layer 38, the gold layer 36, the electro-restrictive plate 32, the bottom gold layer 42 and the mirror layer 48 which may be constructed in substantially the same manner as described with respect to FIG. 2. The deformable mirror 14e of FIG. 7E has the two central gold layers 34 and 36 connected to a variable high voltage source and the upper gold layer 72 and lower gold layer 42 connected to ground, as illustrated. By applying an electrical potential on layers 34, 36 through the plates 30, 32 to the grounded layers 72, 42, respectively, the entire deformable mirror 14a will be deformed to form a concave surface on the mirror layer 48 whereby the deformable mirror 14a may be used to change the focal length of an image reflected from mirror layer 48. In this embodiment the polarity of the electro-restrictive plates 30, 32 are reversed rather than being aligned because the electric fields therethrough are reversed and thus the deformation is additive. This form of deformable mirror is useful in conjugate tuning of an optical system, as distinguished from wavefront correction in the adaptive optics system, which may be useful in conjunction with a wavefront sensor for conjugate tuning in a data transmission system using light waves. In the embodiment of FIG. 7E, the polarity of the applied electrical potential may be reversed, that is, the central gold layers 34, 36 may be grounded and the outer gold layers 72, 42 may be used for applying the variable high voltage for varying the focal length of the deformable mirror 14e.

Figure 7F:
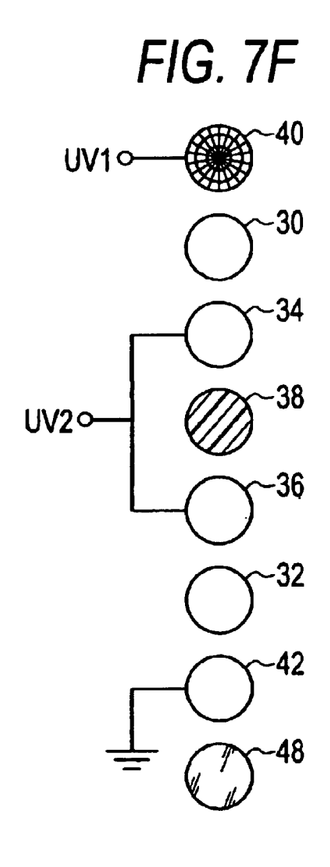

Referring now to FIG. 7F, an embodiment of the deformable mirror 14 with deformations controlled by unipolar voltages is diagrammatically illustrated. The electrode segments of the electrode layer 40 are individually connected to unipolar voltage source UV 1 for selectively applying the desired unipolar voltage to each of the electrode segments for deforming the mirror. Note that for simplicity of illustration, only one voltage source is shown. However, each electrode segment of the electrode layer 40 is connected to a source of unipolar voltage to allow selective control of each electrode. Voltage source UV 1 is unipolar. That is, it can supply either positive or negative voltage to the electrode, but not both positive and negative. Providing such a unipolar voltage source is less expensive than providing a bipolar voltage source capable of supplying both positive and negative voltage, so the cost of the mirror with such a unipolar voltage source is reduced.

Preferably, the polarity of the voltages provided by unipolar voltage source UV 1 are chosen such that the voltage across the electro-restrictive plate 30 to the gold layer 34 is in the same direction of the polarity of the electro-restrictive plate 30. This provides greater deformations than if the voltage across the electro-restrictive plate 30 to the gold layer 34 were in the opposite direction of the polarity of the electro-restrictive plate 30, and reduces the chances of removing the electro-restrictive properties of the electro-restrictive plate 30.

Central gold layers 34 and 36 are connected to a second unipolar voltage source UV 2. The second unipolar source UV 2 provides a unipolar voltage to central gold layers 34 and 36. Preferably the voltage provided by unipolar voltage source UV 2 is chosen such that the voltage across the electro-restrictive plate 32 to the gold layer 42 is in the same direction of the polarity of the electro-restrictive plate 32. Gold layer 42 is connected to electrical ground. In one embodiment, the second unipolar source UV 2 is held at a constant value, and varying the voltage provided by the first unipolar voltage source UV 1 controls the curvature of the mirror. In another embodiment, both unipolar voltage sources UV 1 and UV 2 are varied to control the curvature of the mirror. In yet a third embodiment, the first unipolar source UV 1 is held at a constant value, and the curvature of the mirror is controlled by varying the voltage provided by the second unipolar voltage source UV 2.

Figure 8A:
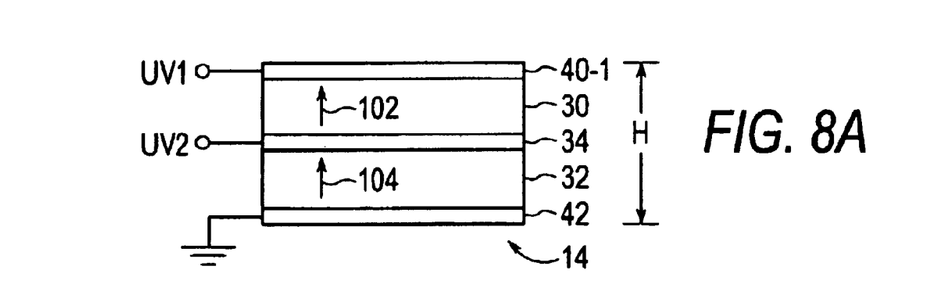
FIGS. 8A–8C illustrate how the embodiment of FIG. 7F is controlled to provide both concave and convex curvatures, as well as an extra focus stroke.
Figure 8B:
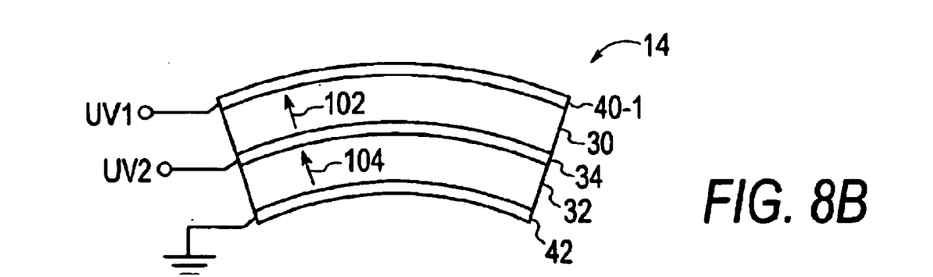
Figure 8C:
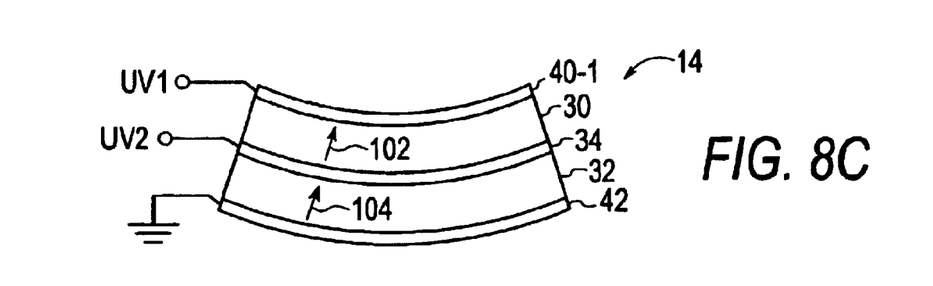

FIGS. 8A–8C illustrate how the embodiment of FIG. 7F is controlled to provide both concave and convex curvatures, as well as an extra focus stroke using unipolar voltage sources. For simplicity, FIGS. 8A–8C illustrate the electric fields applied, the curvature of the mirror 14, and the focus stroke with just one electrode segment 40-1 in the electrode layer 40. Also for simplicity, gold layers 34 and 36 are combined and shown as a single gold layer 34, and the mirror layer 48 is not shown in FIGS. 8A–8C. The polarities of both the electro-restrictive plates 30 and 32 in FIGS. 8A–8C are shown by arrows 102 and 104 and the unipolar voltage sources UV1 and UV2 are assumed to apply positive voltages. Electro-restrictive plates 30 and 32 with opposite polarities may also be used. However, if such oppositely-polarized plates are used, it would be preferable to also reverse the polarity of the voltages supplied by the unipolar voltage sources UV1 and UV2.

FIG. 8A illustrates the mirror embodiment 14 of FIG. 7F with equal electric field strengths across both plates 30 and 32. For example, gold layer 42 may be at ground, with no voltage applied to gold layer 34, and no voltage applied to electrode segment 40-1. This results, as shown in FIG. 8A, in a deformable mirror 14 that is not curved. In the previous example, each electro-restrictive plate has zero electric field across it. Alternately, equal nonzero electric fields across plates 30 and 32 may be applied. If the electric field strength across gold layers 42 and 34 is equal to the electric field strength between gold layer 34 and electrode 40-1, there is no curvature in the mirror. For example, assuming both plates 30 and 32 are of equal thickness, if 100 volts were applied to gold layer 34 and 200 volts applied to electrode 40-1, the voltage difference across both plates 30 and 32 would be 100 volts. This would result in equal field strengths across plates 30 and 32, and an uncurved mirror, as shown in FIG. 8A. Note that applying a voltage across the electro-restrictive layers is one way to provide an electric field in the electro-restrictive layers. Other methods to provide an electric field may also be used. Also note that for plates 30 and 32 of equal thickness, by applying equal voltage differences across each plate, equal strength electric fields are created in the electro-restrictive plates. In contrast, were the plates to be of unequal thicknesses, applying equal nonzero voltages would not result in equal electric field strengths.

FIG. 8B illustrates the mirror embodiment 14 of FIG. 7F with unequal electric field strengths applied to cause a concave curvature. To cause a concave curvature in the mirror 14, the electric field strength between the grounded gold layer 42 and the gold layer 34 connected to the second unipolar voltage source UV2 is greater than the electric field strength between the gold layer 34 connected to the second unipolar voltage source UV2 and the electrode segment 40-1 connected to the first unipolar voltage source UV1. That is, UV2>UV1−UV2, assuming that both the voltages output by UV1 and UV2 are greater than zero, both electro-restrictive plates 30 and 32 are of equal thickness, and the electro-restrictive plates 30 and 32 expand longitudinally when a positive voltage is applied in the direction of polarity. As discussed above, it is preferable to keep the electric field across each plate in the same direction as the polarity of the electro-restrictive plate.

For example, in an embodiment with plates 30 and 32 of equal thickness, if 100 volts were applied to gold layer 34 and 100 volts were applied to electrode 40-1, the voltage difference across plate 32 would be 100 volts, and the voltage difference across plate 30 would be zero volts. This would result in the concave curvature shown in FIG. 8B. If the voltage difference across plate 30 were raised, but kept below 100 volts, the curvature would be less. It is also possible to increase the curvature by applying a voltage less than 100 volts to electrode 40-1. However, this would cause the voltage across plate 30 to be opposite to the polarity of plate 30. Therefore, it is preferable to increase the curvature by applying the same voltage greater than 100 volts to both gold layer 34 and electrode 40-1.

FIG. 8C illustrates the mirror embodiment 14 of FIG. 7F with unequal electric fields applied to cause a convex curvature. To cause a convex curvature in the mirror 14, the electric field strength between the grounded gold layer 42 and the gold layer 34 connected to the second unipolar voltage source UV2 is less than the electric field strength between the gold layer 34 connected to the second unipolar voltage source UV2 and the electrode segment 40-1 connected to the first unipolar voltage source UV1. That is, UV2<UV1−UV2, assuming that both the voltages output by UV1 and UV2 are greater than zero, both electro-restrictive plates 30 and 32 are of equal thickness, and the electro-restrictive plates 30 and 32 expand longitudinally when a positive voltage is applied in the direction of polarity. As discussed above, it is preferable to keep the electric field across each plate in the same direction as the polarity of the electro-restrictive plate.

For example, in an embodiment with plates 30 and 32 of equal thickness, if zero volts were applied to gold layer 34 and 100 volts were applied to electrode 40-1, the voltage difference across plate 32 would be zero volts, and the voltage difference across plate 30 would be 100 volts. Thus, the electric field across plate 32 would be less than the electric field across plate 30. This would result in the convex curvature shown in FIG. 8C. If the voltage difference across plate 32 were raised, but kept below 100 volts, the curvature would be less. Note that changing the voltage difference across plate 32 causes a large and uniform curvature change that provides an extra focus stroke, similar to that described with respect to FIG. 7D, above.

As discussed above, in one preferred embodiment, the second unipolar source UV2 is held at a constant value. This allows the curvature of the mirror to be controlled by varying only the voltage provided by the first unipolar voltage source UV1. For example, in one embodiment, the second unipolar voltage source UV2 is held at the constant voltage of 100 volts. To achieve the lack of curvature for a particular electrode segment, as shown in FIG. 8A, the first unipolar voltage source UV1 would apply a voltage to electrode 40-1 sufficient to create an electric field in plate 30 equal in strength to the electric field in plate 32 caused by the 100 volts applied by UV2. Assuming the plates are of equal thickness, UV1 would apply 200 volts to achieve equal field strengths in plates 30 and 32. This provides an equal electric field strength across each plate, so there is no curvature.

To achieve a concave curvature for the electrode segment as shown in FIG. 8B, the first unipolar voltage source UV1 would apply a voltage to create a lesser electric field strength in plate 30 than the 100 volts supplied by UV2 creates in plate 32. In the embodiment with equal plate 30, 32 thicknesses, UV1 would apply less than 200 volts to electrode 40-1 to achieve a concave curvature. This provides a greater voltage difference across the plate 32 than across plate 30, which results in the concave curvature as shown. In this case, the less voltage applied to electrode 40-1, the greater the curvature.

To achieve a convex curvature for the electrode segment as shown in FIG. 8C, the first unipolar voltage source UV1 would apply a voltage to create a greater electric field strength in plate 30 than the 100 volts supplied by UV2 creates in plate 32. In the embodiment with equal plate 30, 32 thicknesses, UV1 applies more than 200 volts to electrode 40-1. This provides a greater voltage difference across plate 30 than across plate 32, which results in the convex curvature as shown in FIG. 8C. In this case, the more voltage applied to electrode 40-1, the greater the convex curvature. Thus, holding the second unipolar voltage source UV2 at a constant value allows each electrode 40-1 through 40-N to simultaneously and independently apply a concave curvature, a convex curvature, or no curvature to its associated section of plate 30.

In one embodiment, a controller (not shown) controls the variable voltages applied to the electrode segments and the central gold layer. This controller may be implemented in hardware, such as dedicated electronics or an ASIC, and/or software. For example, in the embodiment shown in FIGS. 7F and 8A–8D, the controller controls the unipolar voltages applied to the electrodes and gold layer. Thus, when a concave curvature is desired, the controller controls the unipolar voltage sources so that the voltage difference between the grounded gold layer 42 and gold layer 34 is greater than the voltage difference between the gold layer 34 and the electrode segment. When a convex curvature is desired, the controller controls the unipolar voltage sources so that the voltage difference between the grounded gold layer 42 and the gold layer 34 is less than the voltage difference between the gold layer 34 and the electrode segment. Finally, when a focus stroke without curvature is desired, the controller controls the unipolar voltage sources so that the voltage difference between the grounded gold layer 42 and the gold layer 34 is the same as the voltage difference between the gold layer 34 and the electrode segment.

Referring again to FIG. 1, it may be seen that the deformable mirrors 14 described in detail with respect to FIGS. 2–6 and 7A–7D and 7F and innumerable variations thereof may be used in the optical system of FIG. 1 or any other optical system that is susceptible to adaptive optics for correcting a light wavefront by using the deformable mirror 14 of the present invention. As the light rays R that are reflected by the deformable mirror 14 and received by the wavefront sensor S, which through the CPU applies the appropriate high voltages HV to the respective electrode segments 40-1 through 40-N (or 34-1 through 34-N or 36-1 through 36-N or 42-1 through 42-N in the various embodiments), the slope and curvature of the mirror layer 48 of the mirror 14 are modified continually and instantaneously until the wavefront sensor senses a flat wavefront, as corrected by the deformable mirror 14 in a continuing feedback arrangement, whereby a diffraction limited images is observed at detector D. As changes in the wavefront occur, such changes are sensed by the wavefront sensor S which causes the curvature and/or slope of the deformable mirror 14 to be modified for correcting the change in the wavefront to assure that the wavefront reaching the detector D is continually corrected. Initially, the optical system of FIG. 1 or any similar optical system having an adaptive optics arrangement using the deformable curvature mirror 14, may be calibrated by introducing a controlled light source so that the wavefront sensor S may detect whether the mirror layer 48 of the deformable mirror 14 is providing a diffraction limited image and, if not, such as by reason of manufacturing defects or the like, the wavefront sensor S and CPU can apply appropriate high voltages to the electrode segments of the deformable mirror for correcting the mirror to an optically correct condition. Thereafter, as the optical system is used and the wavefront of the light entering rays R is less than diffraction limited by reason of aberrations in the atmosphere, additional or different high voltages are applied to the deformable mirror 14 from the wavefront sensor S and CPU through the wires W-1 through W-N to the electrode segments of the mirror for correcting the wavefront. Although the deformable mirror of the present invention has been described in connection with a specific optical system, namely, the telescope illustrated in FIG. 1, it will readily appear to those skilled in the art that the deformable mirror may be used in any optical system in which adaptive optics for correcting the wavefront may be useful, and that numerous variations and modifications of the precise construction of the deformable mirror and the arrangement of the pattern of the electrode segments, in addition to those disclosed herein, may be made without departing from the invention as hereinafter claimed.

What is claimed is:

1. A deformable curvature mirror capable of controlled deformation by applying electrical voltages, comprising:
   a first plate of an electro-restrictive material with an outer surface and an inner surface;
   a second plate of an electro-restrictive material with an outer surface and an inner surface,
      the inner surface of the second plate connected to the inner surface of the first plate;
   a mirrored surface connected to the outer surface of the first plate;
   a first conductive layer between the inner surface of the first plate and the inner surface of the second plate;
   a pattern comprising a first plurality of electrode segments connected to the outer surface of the second plate;
   a first plurality of unipolar voltage sources for applying variable unipolar electrical voltages to the first plurality of electrode segments; and
   a second unipolar voltage source connected to the first conductive layer for applying a variable unipolar electrical voltage to the first conductive layer.

2. The mirror of claim 1, further comprising a second conductive layer between the outer surface of the first plate and the mirrored surface, the second conductive layer being connected to electrical ground.

3. The mirror of claim 2, further comprising a controller for controlling the first plurality of unipolar voltage sources and the second unipolar voltage source.

4. The mirror of claim 3, wherein the first plate has a polarity, the second plate has a polarity, and the controller controls the first plurality of unipolar voltage sources and the second unipolar voltage source so that polarities of the voltages across the first and second plates are in the same direction as the polarities of the first and second plates.

5. A deformable curvature mirror capable of controlled deformation by applying electrical voltages, comprising:
   a first plate of an electro-restrictive material with an outer surface and an inner surface;
   a second plate of an electro-restrictive material with an outer surface and an inner surface,
      the inner surface of the second plate connected to the inner surface of the first plate;
   a mirrored surface connected to the outer surface of the first plate;
   a pattern comprising a first plurality of electrode segments connected to the outer surface of the second plate;
   a first plurality of unipolar voltage sources for applying variable unipolar electrical voltages to the first plurality of electrode segments; and
   a first conductive layer between the outer surface of the first plate and the mirrored surface.

6. The mirror of claim 5, wherein the first conductive layer is connected to electrical ground.

7. A deformable curvature mirror capable of controlled deformation by applying electrical voltages, comprising:
   a first plate of an electro-restrictive material with an outer surface and an inner surface;
   a second plate of an electro-restrictive material with an outer surface and an inner surface,
      the inner surface of the second plate connected to the inner surface of the first plate;
   a mirrored surface connected to the outer surface of the first plate;
   a pattern comprising a first plurality of electrode segments connected to the outer surface of the second plate;
   a first plurality of unipolar voltage sources for applying variable unipolar electrical voltages to the first plurality of electrode segments; and
   a second plurality of electrode segments between the inner surface of the first plate and the inner surface of the second plate with electrical terminals for applying variable unipolar voltages to the second plurality of electrode segments.

8. The mirror according to claim 7, further comprising a first conductive layer between the inner surface of the first plate and the inner surface of the second plate, wherein the second plurality of electrode segments are arranged in an outer ring surrounding and separate from the first conductive layer.

9. A deformable curvature mirror capable of controlled deformation by applying electrical voltages, comprising:
- a first plate of an electro-restrictive material with an outer surface, an inner surface, and having a polarity;
- a second plate of an electro-restrictive material with an outer surface, an inner surface, and having a polarity;
- a first conductive layer between and connected to the inner surface of the first plate and the inner surface of the second plate;
- a mirror surface connected to the outer surface of the second plate and having an electrical terminal for applying a unipolar electrical voltage thereto;
- a second conductive layer connected to the outer surface of the second plate between the second plate and the mirror surface and connected to electrical ground; and
- a pattern of a first plurality of conductive electrode segments on the outer surface of the first plate, each of the conductive electrode segments having a separate electrical terminal for applying a variable unipolar electrical voltage thereto for selectively deforming the first plate and, in turn, the curvature of the mirror.

10. The mirror according to claim 9, wherein the respective polarities of the first and second plates are oriented in the same direction.

* * * * *